(12) United States Patent
Bellmore et al.

(10) Patent No.: US 11,440,298 B2
(45) Date of Patent: Sep. 13, 2022

(54) POUCH AND FILM FOR A POUCH

(71) Applicant: Scholle IPN Corporation, Northlake, IL (US)

(72) Inventors: David Bellmore, DeWitt, MI (US); Joel Monroe, Chicago, IL (US)

(73) Assignee: Scholle IPN Corporation, Northlake, IL (US)

( * ) Notice: Subject to any disclaimer, the term of this patent is extended or adjusted under 35 U.S.C. 154(b) by 862 days.

(21) Appl. No.: 15/635,961

(22) Filed: Jun. 28, 2017

(65) Prior Publication Data

US 2019/0001633 A1    Jan. 3, 2019

(51) Int. Cl.
*B32B 1/02* (2006.01)
*B32B 27/08* (2006.01)
(Continued)

(52) U.S. Cl.
CPC .............. *B32B 27/08* (2013.01); *B32B 1/00* (2013.01); *B32B 1/04* (2013.01); *B32B 7/12* (2013.01); *B32B 15/08* (2013.01); *B32B 15/09* (2013.01); *B32B 15/20* (2013.01); *B32B 27/306* (2013.01); *B32B 27/32* (2013.01); *B32B 27/327* (2013.01); *B32B 27/36* (2013.01); *B65D 41/02* (2013.01); *B65D 75/008* (2013.01); *B65D 75/30* (2013.01); B32B 2250/02 (2013.01); B32B 2250/05 (2013.01); B32B 2250/24 (2013.01); B32B 2255/10 (2013.01); B32B 2255/20 (2013.01); B32B 2307/412 (2013.01); B32B 2307/514 (2013.01); B32B 2307/7244 (2013.01); B32B 2307/7246 (2013.01); B32B 2323/046 (2013.01); B32B 2329/04 (2013.01); B32B 2367/00 (2013.01); B32B 2439/06 (2013.01); B32B 2439/40 (2013.01); *B32B 2439/46* (2013.01); *B32B 2439/70* (2013.01);
(Continued)

(58) Field of Classification Search
CPC .... B32B 1/02; B32B 1/00; B32B 1/04; B32B 7/12; B32B 15/08; B32B 15/09; B32B 15/20; B32B 27/32; B32B 27/36; B32B 27/306; B32B 27/327; Y10T 428/1352; Y10T 428/31855; Y10T 428/31786
USPC .............. 428/35.7, 36.7, 480, 500, 688, 689
See application file for complete search history.

(56) References Cited

U.S. PATENT DOCUMENTS

| | | | | |
|---|---|---|---|---|
| 4,608,286 A | * | 8/1986 | Motoishi | B32B 27/32 428/220 |
| 7,029,734 B1 | * | 4/2006 | Wuest | B32B 27/08 428/220 |

(Continued)

FOREIGN PATENT DOCUMENTS

| | | |
|---|---|---|
| EP | 1391295 A1 | 2/2004 |
| EP | 2316644 A2 | 5/2011 |

*Primary Examiner* — Marc A Patterson
(74) *Attorney, Agent, or Firm* — The Watson IP Group, PLC; Jovan N. Jovanovic

(57) ABSTRACT

A film for use in the formation of a flexible package that has a first layer and a second layer that are laminated together to form a two layer laminate. The first layer is a base comprising polyethylene terephthalate, with at least one of the outer surface and the inner surface having a barrier layer disposed thereon. The second layer is a coextrusion having (Continued)

a core layer comprising an ethylene vinyl alcohol with an outer upper layer of a linear low density polyethylene and an outer lower layer of linear low density polyethylene.

19 Claims, 2 Drawing Sheets

(51) Int. Cl.
| | |
|---|---|
| *B32B 15/09* | (2006.01) |
| *B32B 15/08* | (2006.01) |
| *B32B 27/32* | (2006.01) |
| *B32B 15/20* | (2006.01) |
| *B32B 7/12* | (2006.01) |
| *B32B 1/04* | (2006.01) |
| *B32B 1/00* | (2006.01) |
| *B65D 75/00* | (2006.01) |
| *B32B 27/30* | (2006.01) |
| *B32B 27/36* | (2006.01) |
| *B65D 41/02* | (2006.01) |
| *B65D 75/30* | (2006.01) |
| *B32B 1/08* | (2006.01) |
| *B65D 65/40* | (2006.01) |
| *B65D 75/58* | (2006.01) |

(52) U.S. Cl.
CPC .......... *B32B 2439/80* (2013.01); *B65D 65/40* (2013.01); *B65D 75/5883* (2013.01)

(56) References Cited

U.S. PATENT DOCUMENTS

| | | | |
|---|---|---|---|
| 8,834,977 B2 * | 9/2014 | Bellmore | B65D 5/56 428/34.1 |
| 2002/0187290 A1 * | 12/2002 | Hodson | B32B 27/08 428/35.7 |
| 2004/0067375 A1 * | 4/2004 | Rassouli | B32B 7/12 428/461 |
| 2012/0052225 A1 * | 3/2012 | Kani | C08L 23/0861 428/35.4 |
| 2012/0181276 A1 * | 7/2012 | Ichikawa | A61J 1/03 220/200 |
| 2015/0049964 A1 | 2/2015 | Bellmore et al. | |
| 2017/0088318 A1 * | 3/2017 | Franca | B65D 47/2031 |

* cited by examiner

POUCH AND FILM FOR A POUCH

CROSS-REFERENCE TO RELATED APPLICATION

N/A

BACKGROUND OF THE DISCLOSURE

1. Field of the Disclosure

The disclosure relates in general to flexible packaging, and more particularly, to a flexible package, and a pouch, as well as to a film for a pouch. Preferably, the film is transparent.

2. Background Art

The use of pouches and other flexible packaging having a spout is becoming increasingly ubiquitous. Typically, such pouches have a spout that provides ingress into the pouch cavity. The pouches can be filled with a flowable material.

Typically, such pouches are formed from films that include metallized layers. Generally, such films are opaque, often having a metallized or a foil layer. Such layers are generally required to provide adequate oxygen barrier properties to the packaging.

Problematically, while such packaging film provides adequate oxygen barrier properties, it is not possible to view the contents of the pouch. On the other hand, where transparent films have been tried, such films lack the necessary oxygen barrier properties to preclude degradation to the contents of the package.

SUMMARY OF THE DISCLOSURE

The disclosure is directed, in one aspect to a film for use in the formation of a flexible package comprising first layer and a second layer. The first layer has an outer surface and an inner surface. The second layer has an outer surface and an inner surface. The inner surface of the first layer laminated to the outer surface of the second layer to form a two layer laminate. The first layer further comprises a base comprising polyethylene terephthalate, with at least one of the outer surface and the inner surface having a barrier layer disposed thereon. The second layer comprises a coextrusion having a core layer comprising an ethylene vinyl alcohol with an outer upper layer comprising linear low density polyethylene and an outer lower layer comprising linear low density polyethylene.

In some configurations, the second layer further includes an upper tie layer between the upper outer layer and the core layer and a lower tie layer between the lower outer layer and the core layer. The upper tie layer and the lower tie layer each comprising a maleic anhydride modified linear low density polyethylene.

In some configurations, the barrier layer comprises one of the group selected from: Aluminum Oxides ($AlO_x$), Silicone Oxides ($SiO_x$), polyvinyl alcohol (PVOH), polyvinylidene chloride (PVdC) and combinations of the foregoing.

In some configurations, the first layer has a thickness of approximately 12 μm.

In some configurations, the upper outer layer has a thickness of approximately 33 μm and the lower outer layer has a thickness of approximately 33 μm.

In some configurations, the ethylene vinyl alcohol comprises 29 mol % ethylene.

In some configurations, the core layer has a thickness of approximately 8 μm.

In some configurations, the second layer has a thickness of approximately 89 μm.

In some configurations, the upper outer layer and the lower outer layer are substantially identical.

In some configurations, the film is substantially transparent.

In another aspect of the disclosure, the disclosure is directed to a film for use in the formation of a flexible package. The film includes a first layer and a second layer. The first layer has an outer surface and an inner surface. The second layer has an outer surface and an inner surface. The inner surface of the first layer is laminated to the outer surface of the second layer to form a two layer laminate. The first layer further comprises a base comprising polyethylene terephthalate, with at least one of the outer surface and the inner surface having a barrier layer disposed thereon. The first layer has a thickness of approximately 12 μm. The second layer comprises a coextrusion having a thickness of approximately 89 μm, and has a core layer comprising a 29 mol % ethylene ethylene vinyl alcohol. And, the second layer further includes an outer upper layer comprising linear low density polyethylene and an outer lower layer comprising linear low density polyethylene, with an upper tie layer between the upper outer layer and the core layer, and a lower tie layer between the lower outer layer and the core layer. The core layer has a thickness of approximately 8 μm. Each of the upper outer layer and the lower outer layer have a thickness of approximately 33 μm.

In some configurations, the barrier layer comprises an Aluminum Oxide ($AlO_x$).

In some configurations, the barrier layer comprises one of the group consisting of: Silicone Oxides ($SiO_x$), polyvinyl alcohol (PVOH), polyvinylidene chloride (PVdC) and combinations of the foregoing.

In some configurations, the upper and lower tie layers comprise a maleic anhydride modified linear low density polyethylene.

In some configurations, the first layer and the second layer are laminated with an adhesive.

In some configurations, the oxygen transmission measured in cc/100 in$^2$/day at 100% $O_2$ in a 50/50% relative humidity at 23° C. is less than 0.010.

In some configurations, the oxygen transmission measured in cc/100 in$^2$/day at 100% $O_2$ in a 50/50% relative humidity at 23° C. of the film after submersion in water at 95° C. for 10 minutes is less than 0.010.

In yet another aspect of the disclosure, the disclosure is directed to a pouch comprising a front panel and a back panel sealed together with a seal to define a cavity, with a spout coupled to at least one of the front panel and the back panel. The spout has an opening providing communication into the cavity. At least one of the front panel and the back panel are formed, at least partially from a film comprising a first layer and a second layer. The first layer has an outer surface and an inner surface. The second layer has an outer surface and an inner surface. The inner surface of the first layer is laminated to the outer surface of the second layer to form a two layer laminate. The first layer further comprises a base comprising polyethylene terephthalate, with at least one of the outer surface and the inner surface having a barrier layer disposed thereon. The second layer comprises a coextrusion having a core layer comprising an ethylene vinyl alcohol with an outer upper layer comprising linear low density polyethylene and an outer lower layer comprising linear low density polyethylene.

In some configurations, the pouch further comprises a base gusset panel.

BRIEF DESCRIPTION OF THE DRAWINGS

The disclosure will now be described with reference to the drawings wherein.

DETAILED DESCRIPTION OF THE DISCLOSURE

Figure 1:
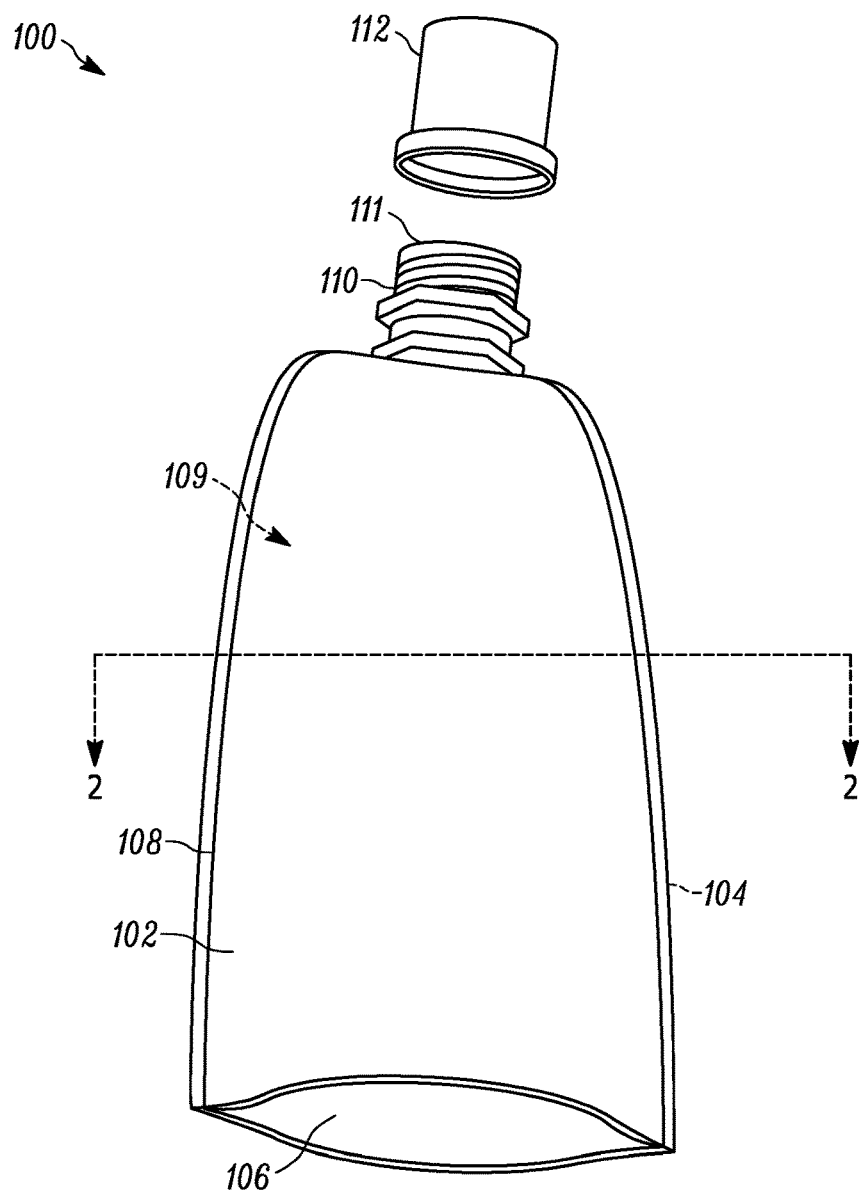
FIG. 1 of the drawings is a perspective view of an exemplary pouch of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
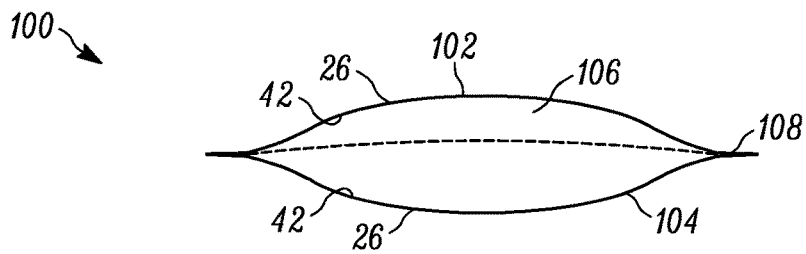
FIG. 2 of the drawings is a cross-sectional view of the pouch taken generally about lines 2-2 of FIG. 1.

Referring now to the drawings and in particular to FIGS. 1 and 2, a flexible packaging, and more particularly a pouch, of the type intended for use with the film 10 of the present disclosure is shown generally at 100. The disclosure is not limited to use of the film 10 in association with a pouch or the particular pouch shown in FIG. 1, and the pouch 100 is for illustrative purposes solely. The pouch 100 is typically configured for the storage and dispensing of flowable material, such as, for example, syrups, gels, sauces, dressings, juices, purees among other flowable material. And, the disclosure is not limited to any particular type of flowable material that is maintained, stored, contained and/or dispensed from the pouch 100.

The pouch 100, in one configuration, includes a plurality of panels. These panels, in the configuration shown include front panel 102, back panel 104 and base gusset panel 106. The base gusset panel spans between the front and back panel and can, together with the front and back panels, define a base. It will be understood that each of the panels may be formed from multiple separate panels that are attached (i.e., sealed or otherwise) together. At the same time, multiple panels may be formed from the same piece of material, wherein the panels are separated by a fold (which may or may not include a seal). In some configurations, two panels may be utilized and the base gusset panel may be omitted.

In the configuration shown, seals 108 extend about the periphery of the panels and define cavity 109. The cavity 109 can have any number of different shapes and the like, and the shape is not limited to that which is disclosed. The seals 108 may comprise a continuous seal or may form a combination of seals and folds that properly define a cavity 109 that is fluid tight. The seals may comprise a number of differently formed seals, including heat seals, RF seals, sonic welding, among other solutions.

Spout 110 is coupled to the pouch by having a portion extending between the front and back panel proximate the upper end thereof and being sealed to each the seals 108. In the configuration shown, the spout includes opening 111 which provides fluid communication with the cavity 109. It will be understood that cap 112 can be positioned over the opening 111 to effectively seal the cavity 109 at the spout. It will be understood that further features, such as frangible covers, tamper evident constructions and the like may be associated with the spout to provide additional utility. It will further be understood that in some configurations, a spout may be omitted and access is made to the contents by piercing or ripping one or more panels of the pouch. In other configurations, multiple spouts may be provided on a single pouch.

Generally, the pouch 100 may be of a number of different sizes and shapes. For example, the pouch 100 may be configured with a volume of between 80 ml and 500 ml. Of course, both larger and smaller volumes are contemplated. The flowable material may be filled in any number of different manners, including hot fill, cold fill, aseptic and the like. There is no limitation as to the type of filling or any particular limitation as to the size of the pouch. However, it has been found that film 10 is well suited for use in association with pouches of the sizes identified herein, but noted as exemplary.

Figure 3:
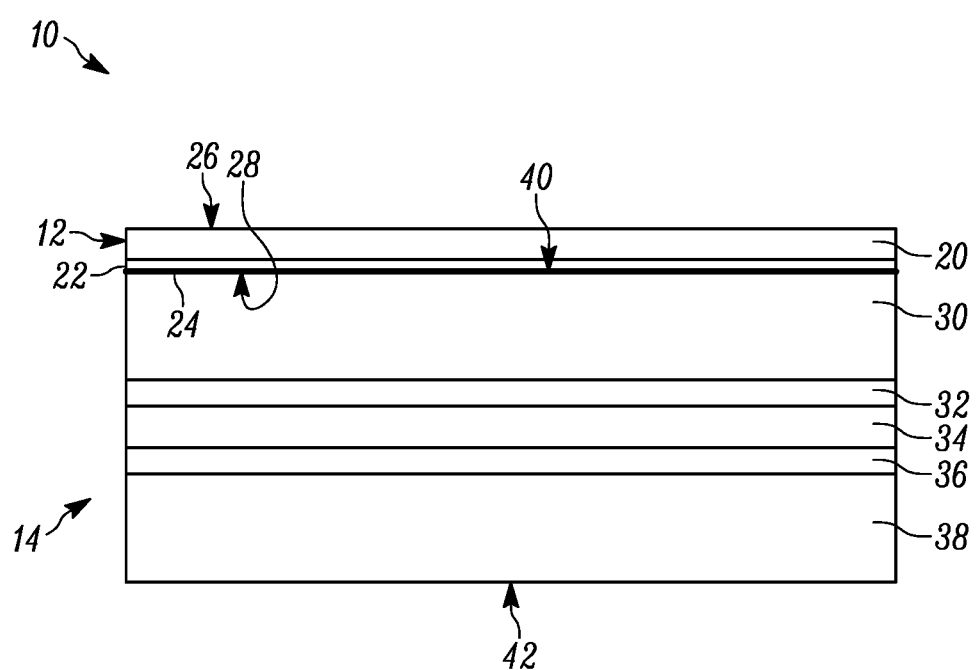
FIG. 3 of the drawings is a cross-sectional view of the film from which the pouch can be formed.

The pouches of the above-identified configuration, among other configurations, are formed, in part or in whole from film 10. With reference to FIG. 3, the film 10 comprises a substantially transparent film which can, in some configurations, accepting printing, labels and the like. It will be understood that the entirety of the pouch may be formed from the film 10, or only some or portions of some of the panels 102, 104, 106 may be formed from the film 10. The film 10 is formed from a two layer laminate. The first layer 12 of the two layer laminate is laminated to a second layer 14. The second layer 14 comprises a multilayer coextrusion. The two layers are laminated through a number of different lamination methods, including, adhesive lamination and heat lamination, among others. In the configuration shown, the lamination is an adhesive lamination, while the disclosure is not limited thereto. The first layer 12 includes outer surface 26 and inner surface 28. The second layer 14 includes outer surface 40 and inner surface 42. In the pouch configuration of FIG. 1, the outer surface 26 of the first layer 12 is the outer surface of the pouch, with the inner surface 42 of the second layer, the product contact surface. The opposing pouch walls are joined together by seals that couple opposing inner surfaces of opposing second layers together.

The first layer 12 of the two layer laminate includes a base 20, one or more barrier layers 22 and one or more protective coatings 24. The base 20 comprises a polyethylene terephthalate (PET) material. In one configuration, the PET material has a thickness of approximately 12 μm. The desired range of thickness for the PET material is 8 through 30μ. The PET has a kinetic coefficient of friction that is generally less than <0.3 according to ASTM D1894, a tensile strength of >7,000 g/in according to ASTM D882, and an elongation of <200% according to ASTM D882, all of which allow for pouch converting and filling. The haze<5% according to ASTM D1003 and wetting tension>40 dyne/cm according to ASTM D2578. Such properties allow for reverse printing. The PET material is coated with a vapor deposition barrier layer comprising Aluminum Oxide ($AlO_x$). A protective coating 24 may be applied to the vapor deposition barrier layer opposite the PET material. In some configurations, the barrier layers may be applied to both sides of the base or only on one side of the base. Similarly, protective coatings may be applied to the barrier layers or directly to the PET, depending of the configuration.

Some films that are commercially available and which can be utilized as the first layer 12 include a film sold under the name GLARH available from Toppan USA, Inc. of Griffin, Ga. Another suitable film for first layer 12 is a film sold under the name GLARDF also available from Toppan USA, Inc. of Griffin, Ga. Another suitable film for the first layer includes a film sold under the name Kurarister C available from Kuraray America Inc. of Houston, Tex. Another suitable film for first layer 12 is a film sold under the name HGCX available from Toray Plastics (America), Inc. of North Kingstown, R.I. The properties of each of the foregoing are incorporated fully herein. It will further be understood that other films that are commercially available as well as other films that can be formed may also be utilized for first layer 12 of the two layer laminate, and the films provided are merely exemplary and not to be deemed limiting.

It is contemplated that the barrier layer, or barrier layers, may comprise Silicone Oxides ($SiO_x$), polyvinyl alcohol (PVOH) or polyvinylidene chloride (PVdC). It is contemplated that the barrier layers may comprise combinations of the foregoing.

The second layer of the two layer laminate comprises a five layer coextrusion. The five layer coextrusion includes an upper outer layer 30, upper tie layer 32, core layer 34, lower tie layer 36 and lower outer layer 38. In the configuration shown, the upper outer layer comprises a linear low density polyethylene (LLDPE). In the configuration shown, the thickness of is approximately 33 μm. The desired thickness of this layer is between 2 and 100 μm. More specifically, the upper outer layer comprises a mixture of two different types of LLDPE at a 50% mixture of each, by weight. It is preferred that the blend have a density of less than substantially approximately 0.92 g/cc. It is preferred that the first LLDPE have a density of substantially approximately 0.906 g/cc and more preferably between 0.892 g/cc and 0.920 g/cc. It is preferred that the second LLDPE have a density of substantially approximately 0.920 g/cc and more preferably between 0.900 g/cc and 0.940 g/cc. It is also contemplated that the ratio of the first LLDPE to the second LLDPE can be generally anywhere between 0% and 100%.

A number of additives may be incorporated into the upper outer layer, including, but not limited to an anti-block, slip, polymer processing aid and anti-oxidant additives. Other additives are also contemplated by the present disclosure to be incorporated into the upper outer layer, and the foregoing, are merely exemplary. The additives may be incorporated for particular applications, or for particular resin combinations to provide improved characteristics as desired.

The lower outer layer 38 is of similar composition, although the upper outer layer 30 and the lower outer layer 38 are not required to be identical in thickness or in composition.

The upper tie layer 32 and the lower tie layer 36, in the configuration shown, comprises a maleic anhydride modified LLDPE. In the configuration shown, the thickness of each of these layers is approximately 8 μm. The desired thickness of these layers is between 2 and 25 μm. These layers provide a coupling and the ability to coextrude the core layer with the upper outer layer and the lower outer layer. Among other materials a resin suitable for use is available from DuPont under the trade name Bynel, from LyondellBassel under the trade name Plexar, as well as from Mitsu under the trade name Admer. Other tie layer materials may comprise polypropylene and other non-polyolefins that can be anhydride-modified. Such materials may comprise the entirety of the composition of the layer, or they may be blended with other non-anhydride-modified materials. For example, to reduce cost, additional materials may be blended. It is also contemplated that acid copolymers, sodium ionomers, zinc ionomers, ethylene vinyl acetate or ethylene methyl acrylate can be utilized as well. As with the outer layers, the upper and lower tie layers need not be identical, and there may be variation between the upper and the lower tie layers, both in material and in physical thickness and dimensions.

The core layer 34 includes a 29 mol % ethylene ethylene vinyl alcohol (EVOH). The thickness of the core layer is approximately 8 μm. The desired thickness of this layer is between 2 and 25 μm. Additionally, it is contemplated that the ethylene content may be between 24 and 48 mol %. [can you give me some other properties of the EVOH, or acceptable variations]. It will be understood that below 2 it has been found that the layer generally does not sufficiently provide barrier to chemicals, flavors and oxygen. At a thickness of greater than 25 μm, it has been found that the layer exhibits generally poor resistance to flex-cracking.

A number of different films were formed. These films were formed as a laminate of one of the commercially available first layers identified above, with a coextruded film having the following structure:

Upper outer layer: 33 μm LLDPE
Upper tie layer: 8 μm maleic anhydride modified LLDPE
Core layer: 8 μm 29 mol % ethylene EVOH
Lower tie layer: 8 μm maleic anhydride modified LLDPE
Lower Outer layer: 33 μm LLDPE Four separate films were prepared laminating a first layer comprising GLARH identified above with the coextruded structure disclosed. These films all included the immediately foregoing second layer coextrusion. The first layer was formed from the commercially available first layers identified above, in the following order, GLARH, GLARDF, Kurarister C, and HGCX.

In the first test, the oxygen transmission was measured in cc/100 in$^2$/day at 100% $O_2$ in a 50/50% relative humidity at 23° C. The results for the four film structures is shown below.

| | |
|---|---|
| 1 | 0.009 |
| 2 | 0.004 |
| 3 | 0.006 |
| 4 | 0.006 |

In a second test, the conditions were the same, except that prior to testing, the samples were submerged in water at a temperature of 95° C. for a period of 10 minutes prior to testing. The submersion in heated water was to replicate a hot-fill scenario and to determine what, if any degradation of the barrier layer 22 and 34 would occur. The results for the four film structures is shown below.

| | |
|---|---|
| 1 | 0.009 |
| 2 | 0.009 |
| 3 | 0.004 |
| 4 | 0.005 |

In light of the foregoing, all four of the films tested had acceptable rates of oxygen transmission under the conditions of the testing, both in the first test and in the second, modified test.

It is contemplated that in some embodiments, a film made according to the disclosure has the following properties, all of which are to be deemed exemplary and not to be deemed limiting. One such film will have a gauge, as measured pursuant to ASTM D-6988, of 101 μm, wherein the first layer has a gauge of 12 μm and the second layer has a gauge of 89 μm; a tensile strength, as measured pursuant to ASTM D-882, of MD: 8400 g, TD 8600 g; elongation at break, as measured pursuant to ASTM D-882, of MD: 90%, TD 90%; puncture resistance, as measured pursuant to D-3420, of 1000 g, an oxygen transmission, as measured by ASTM F-1927, of less than 0.01 cc 100% $O_2$/100 in$^2$/day; and a kinetic COF, as measured by ASTM D-1894 of 0.25. Of course, such properties are set forth as exemplary of one configuration of the film of the present disclosure. The disclosure is certainly not limited to such a configuration.

Advantageously, the construction of a pouch, such as pouch 100, from the barrier film 10 provides a transparent pouch that allows for the visualization of the contents, while having OTR values that render the film and the pouch suitable for most applications and for most flowable materials.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A film for use in the formation of a flexible package comprising:
    a first layer and a second layer, the first layer having an outer surface and an inner surface, and the second layer having an outer surface and an inner surface, the inner surface of the first layer laminated to the outer surface of the second layer to form a two layer laminate,
    the first layer further comprising a base comprising polyethylene terephthalate, with at least one of the outer surface and the inner surface having a barrier layer disposed thereon; and
    the second layer comprising a coextrusion having a core layer comprising an ethylene vinyl alcohol with an outer upper layer comprising linear low density polyethylene and an outer lower layer comprising linear low density polyethylene.

2. The film of claim 1 wherein the second layer further includes an upper tie layer between the upper outer layer and the core layer and a lower tie layer between the lower outer layer and the core layer, the upper tie layer and the lower tie layer each comprising a maleic anhydride modified linear low density polyethylene.

3. The film of claim 2 wherein the barrier layer comprises one of the group selected from: Aluminum Oxides ($AlO_x$), Silicone Oxides ($SiO_x$), polyvinyl alcohol (PVOH), polyvinylidene chloride (PVdC) and combinations of the foregoing.

4. The film of claim 3 wherein the first layer has a thickness of approximately 12 μm.

5. The film of claim 4 wherein the upper outer layer has a thickness of approximately 33 μm and the lower outer layer has a thickness of approximately 33 μm.

6. The film of claim 5 wherein the ethylene vinyl alcohol comprises 29 mol % ethylene.

7. The film of claim 6 wherein the core layer has a thickness of approximately 8 μm.

8. The film of claim 7 wherein the second layer has a thickness of approximately 89 μm.

9. The film of claim 8 wherein the upper outer layer and the lower outer layer are substantially identical.

10. The film of claim 1 wherein the film is substantially transparent.

11. A film for use in the formation of a flexible package comprising:
    a first layer and a second layer, the first layer having an outer surface and an inner surface, and the second layer having an outer surface and an inner surface, the inner surface of the first layer laminated to the outer surface of the second layer to form a two layer laminate,
    the first layer further comprising a base comprising polyethylene terephthalate, with at least one of the outer surface and the inner surface having a barrier layer disposed thereon, the first layer having a thickness of approximately 12 μm;
    the second layer comprising a coextrusion having a thickness of approximately 89 μm, and having a core layer comprising a 29 mol % ethylene ethylene vinyl alcohol with an outer upper layer comprising linear low density polyethylene and an outer lower layer comprising linear low density polyethylene, with an upper tie layer between the upper outer layer and the core layer, and a lower tie layer between the lower outer layer and the core layer, the core layer having a thickness of approximately 8 μm, with each of the upper outer layer and the lower outer layer having a thickness of approximately 33 μm.

12. The film of claim 11 wherein the barrier layer comprises an Aluminum Oxide ($AlO_x$).

13. The film of claim 11 wherein the barrier layer comprises one of the group consisting of: Silicon Oxides ($SiO_x$), polyvinyl alcohol (PVOH), polyvinylidene chloride (PVdC) and combinations of the foregoing.

14. The film of claim 12 wherein the upper and lower tie layers comprise a maleic anhydride modified linear low density polyethylene.

15. The film of claim 14 wherein the first layer and the second layer are laminated with an adhesive.

16. The film of claim 11 wherein the oxygen transmission measured in cc/100 in$^2$/day at 100% $O_2$ in a 50/50% relative humidity at 23° C. is less than 0.010.

17. The film of claim 11 wherein the oxygen transmission measured in cc/100 in$^2$/day at 100% $O_2$ in a 50/50% relative humidity at 23° C. of the film after submersion in water at 95° C. for 10 minutes is less than 0.010.

18. A pouch comprising:
    a front panel and a back panel sealed together with a seal to define a cavity, with a spout coupled to at least one of the front panel and the back panel, the spout having an opening providing communication into the cavity, wherein,
    at least one of the front panel and the back panel are formed, at least partially from a film comprising:
    a first layer and a second layer, the first layer having an outer surface and an inner surface, and the second layer having an outer surface and an inner surface, the inner surface of the first layer laminated to the outer surface of the second layer to form a two layer laminate,
    the first layer further comprising a base comprising polyethylene terephthalate, with at least one of the outer surface and the inner surface having a barrier layer disposed thereon; and
    the second layer comprising a coextrusion having a core layer comprising an ethylene vinyl alcohol with an outer upper layer comprising linear low density polyethylene and an outer lower layer comprising linear low density polyethylene.

19. The pouch of claim 18 further comprising a base gusset panel.

\* \* \* \* \*